(12) United States Patent
Morning-Smith et al.

(10) Patent No.: US 11,023,326 B2
(45) Date of Patent: Jun. 1, 2021

(54) SSD RESTART BASED ON OFF-TIME TRACKER

(71) Applicant: Intel Corporation, Santa Clara, CA (US)

(72) Inventors: Andrew Morning-Smith, Vancouver (CA); Brian Mcfarlane, Hillsboro, OR (US); Emily P. Chung, Austin, TX (US); William Glennan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 166 days.

(21) Appl. No.: 16/294,198

(22) Filed: Mar. 6, 2019

(65) Prior Publication Data
US 2019/0205214 A1  Jul. 4, 2019

(51) Int. Cl.
*G06F 11/14*  (2006.01)
(52) U.S. Cl.
CPC ...... *G06F 11/1441* (2013.01); *G06F 11/1438* (2013.01)
(58) Field of Classification Search
CPC ........ G06F 1/30; G06F 1/3221; G06F 1/3225; G06F 11/1438; G06F 11/1441
USPC ...................................................... 714/14, 22
See application file for complete search history.

(56) References Cited

U.S. PATENT DOCUMENTS

| 8,938,597 | B2* | 1/2015 | Goss ................... G06F 12/0246 |
| | | | 711/165 |
| 9,007,087 | B2* | 4/2015 | Avritch ................... G01R 31/64 |
| | | | 324/764.01 |
| 2014/0317365 | A1 | 10/2014 | Poza et al. |
| 2016/0077579 | A1 | 3/2016 | Yoshikazu et al. |
| 2017/0315889 | A1 | 11/2017 | Christopher et al. |
| 2019/0042113 | A1* | 2/2019 | Li ....................... G06F 11/1441 |

FOREIGN PATENT DOCUMENTS

EP    2835739 A1    2/2015

OTHER PUBLICATIONS

Extended European Search Report for European Patent Application No. 20156096.8, dated Jul. 17, 2020, 9 pages.

* cited by examiner

*Primary Examiner* — Joseph R Kudirka
(74) *Attorney, Agent, or Firm* — Jordan IP Law, LLC

(57) ABSTRACT

An embodiment of a semiconductor apparatus for use with a persistent storage media may include technology to detect a power interruption event, and track an amount of off-time for a persistent storage media after the detected power interruption event. Other embodiments are disclosed and claimed.

17 Claims, 6 Drawing Sheets

US 11,023,326 B2

SSD RESTART BASED ON OFF-TIME TRACKER

TECHNICAL FIELD

Embodiments generally relate to storage systems. More particularly, embodiments relate to a solid state drive (SSD) restart based on an off-time tracker.

BACKGROUND

An SSD device may include persistent storage media such as nonvolatile media. For some media, erasing a block may set all bit values to 1. Programming may refer to the process of changing an erased bit from a bit value of 1 to a bit value of 0. Some media may require that a minimum amount of time passes between an operation on a memory cell and the next operation on the memory cell or may require a different voltage to be applied or compared against for operations depending on the time that has passed.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile (NV) memory (NVM). Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NVM may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Figure 1:
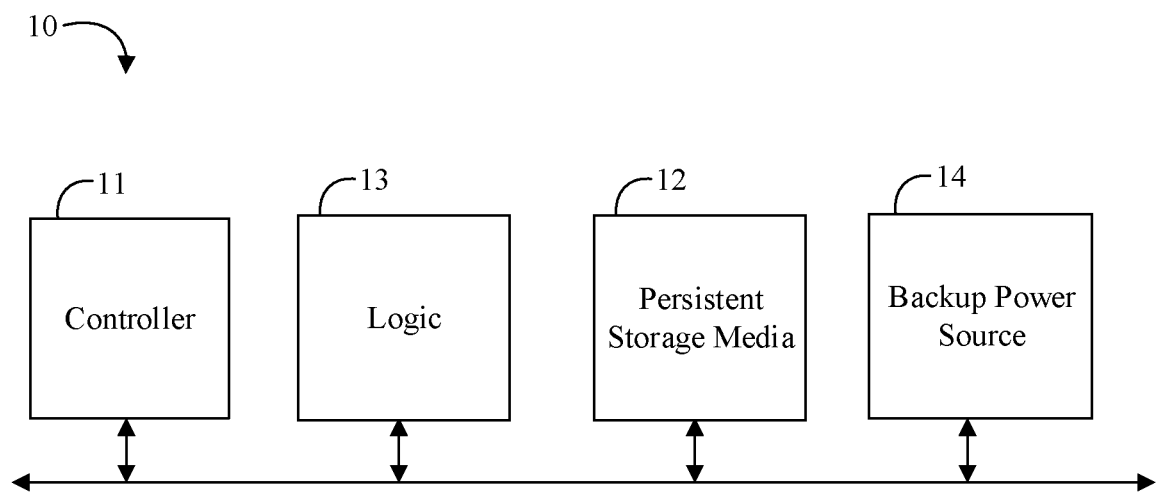
FIG. 1 is a block diagram of an example of an electronic storage system according to an embodiment.

Turning now to FIG. 1, an embodiment of an electronic storage system 10 may include a controller 11, persistent storage media 12 communicatively coupled to the controller 11, and logic 13 communicatively coupled to the controller 11 to detect a power interruption event (e.g., shut down, sleep, hibernate, brown out, etc.), and track an amount of off-time for the persistent storage media 12 after the detected power interruption event. In some embodiments, the logic 13 may be further configured to determine a voltage setting to use for an operation on the persistent storage media 12 after power restoration based on the tracked amount of off-time. For example, the logic 13 may be configured to select a first value for the voltage setting if the tracked amount of off-time is less than a threshold, and select a second value for the voltage setting if the tracked amount of off-time is greater than or equal to the threshold. Alternatively, or additionally, the logic 13 may be configured to select a first value for the voltage setting if the tracked amount of off-time is less than a configured time, start a timer for a duration based on a difference between the configured time and the tracked amount of off-time, and select a second value for the voltage setting after the timer expires.

Some embodiments of the system 10 may further include a backup power source 14 to provide power to the logic 13 to track the amount of off-time for the persistent storage media 12 after the power interruption event. For example, the backup power source 14 may include a battery, an energy storing capacitor, etc. The logic 13 may also include an energy storing capacitor which may be utilized as a timer circuit to track the amount of off-time based on a decay of the capacitor after the power interruption event. In any of the embodiments herein, the persistent storage media 12 may comprise phase change memory (e.g., PCM technology such as INTEL 3D) (POINT). In some embodiments, the logic 13 may be located in, or co-located with, various components, including the controller 11 (e.g., on a same die). Embodiments of the storage system 10 may include SSDs, NV dual-inline memory modules (NVDIMMs), etc. Those skilled in the art will further appreciate that more than one threshold and more than two values for the voltage setting may be applied in some embodiments.

Embodiments of each of the above controller 11, persistent storage media 12, logic 13, backup power source 14, and other system components may be implemented in hardware, software, or any suitable combination thereof. For example, hardware implementations may include analog circuitry, configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a storage controller, a memory controller, a micro-controller a general purpose processor, a special purpose processor, a central processor unit (CPU), etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#or the like and conventional procedural programming languages, such as the "C" programming language or similar programming languages. For example, the persistent storage media 12, firmware memory, or other system memory may store a set of instructions which when executed by the controller 11 cause the system 10 to implement one or more components, features, or aspects of the system 10 (e.g., the logic 13, detecting the power interruption event, tracking the amount of off-time for the persistent storage media 12, etc.).

Figure 2:
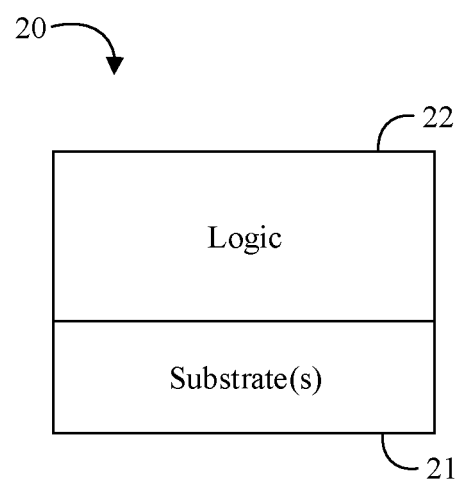
FIG. 2 is a block diagram of an example of a semiconductor apparatus according to an embodiment.

Turning now to FIG. 2, an embodiment of a semiconductor apparatus 20 for use with a persistent storage media may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to detect a power interruption event, and track an amount of off-time for a persistent storage media after the detected power interruption event. In some embodiments, the logic 22 may be further configured to determine a voltage setting to use for an operation on the persistent storage media after power restoration based on the tracked amount of off-time. For example, the logic 22 may be configured to select a first value for the voltage setting if the tracked amount of off-time is less than a threshold, and select a second value for the voltage setting if the tracked amount of off-time is greater than or equal to the threshold. Alternatively, or additionally, the logic 22 may be configured to select a first value for the voltage setting if the tracked amount of off-time is less than a configured time, start a timer for a duration based on a difference between the configured time and the tracked amount of off-time, and select a second value for the voltage setting after the timer expires.

In some embodiments, the logic 22 may be further configured to provide a connection to backup power to track the amount of off-time for the persistent storage media after the power interruption event. In any of the embodiments herein, the persistent storage media may comprise PCM. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include analog circuitry, configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#or the like and conventional procedural programming languages, such as the "C" programming language or similar programming languages.

The apparatus 20 may implement one or more aspects of the method 30 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
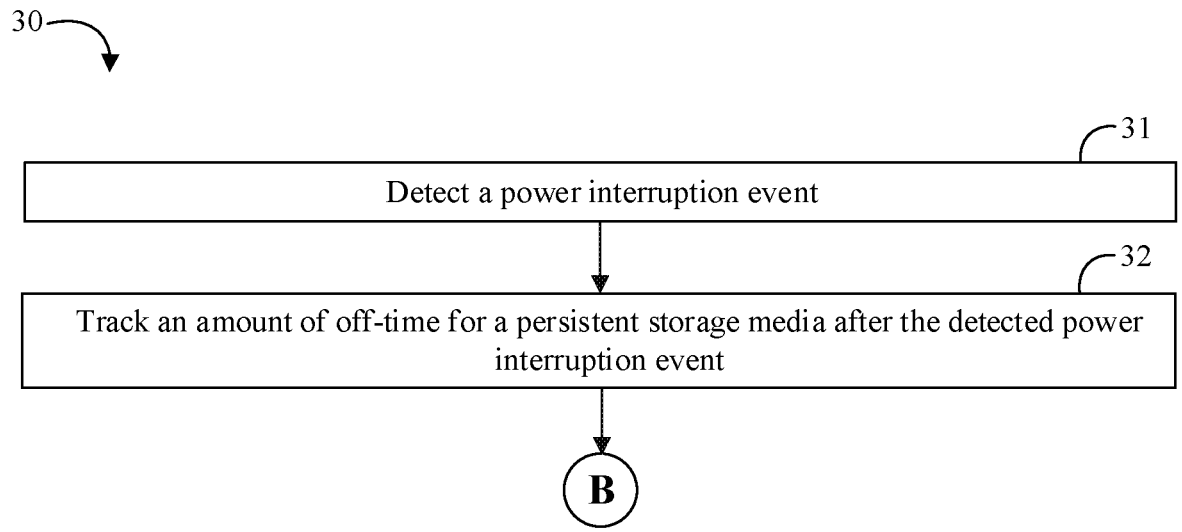
FIGS. 3A to 3C are flowcharts of an example of a method of controlling storage according to an embodiment.
Figure 3B:
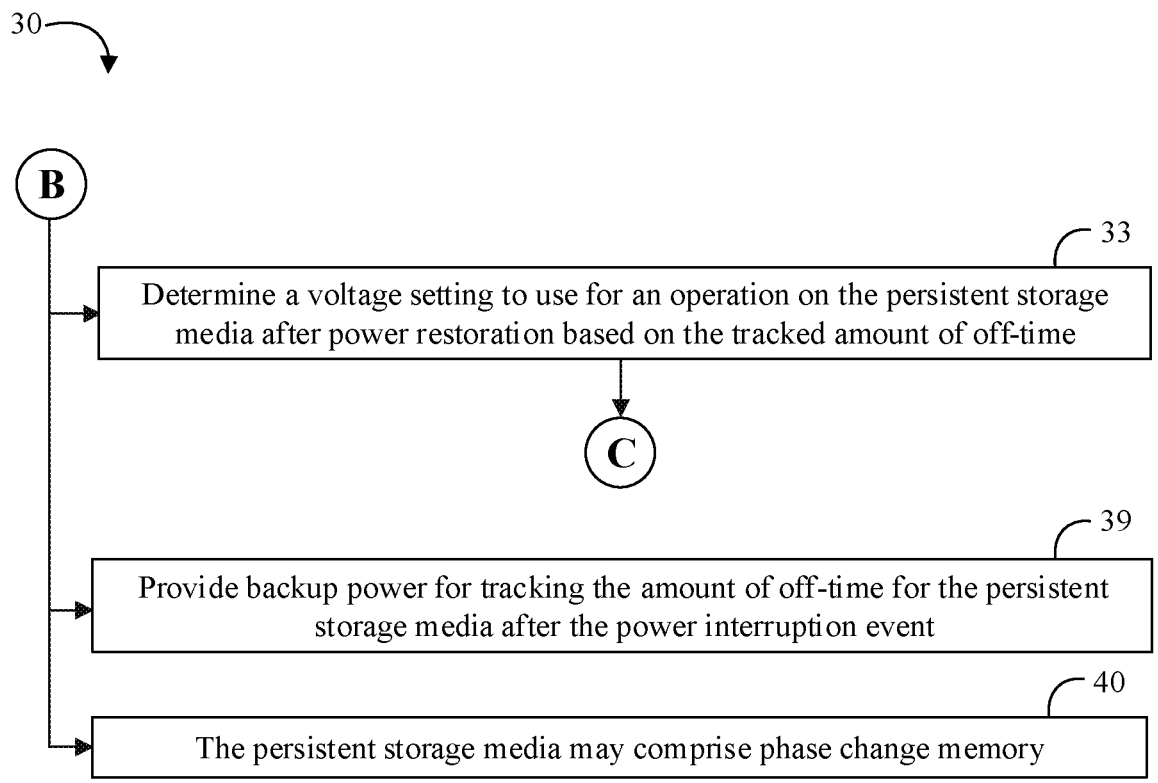
Figure 3C:
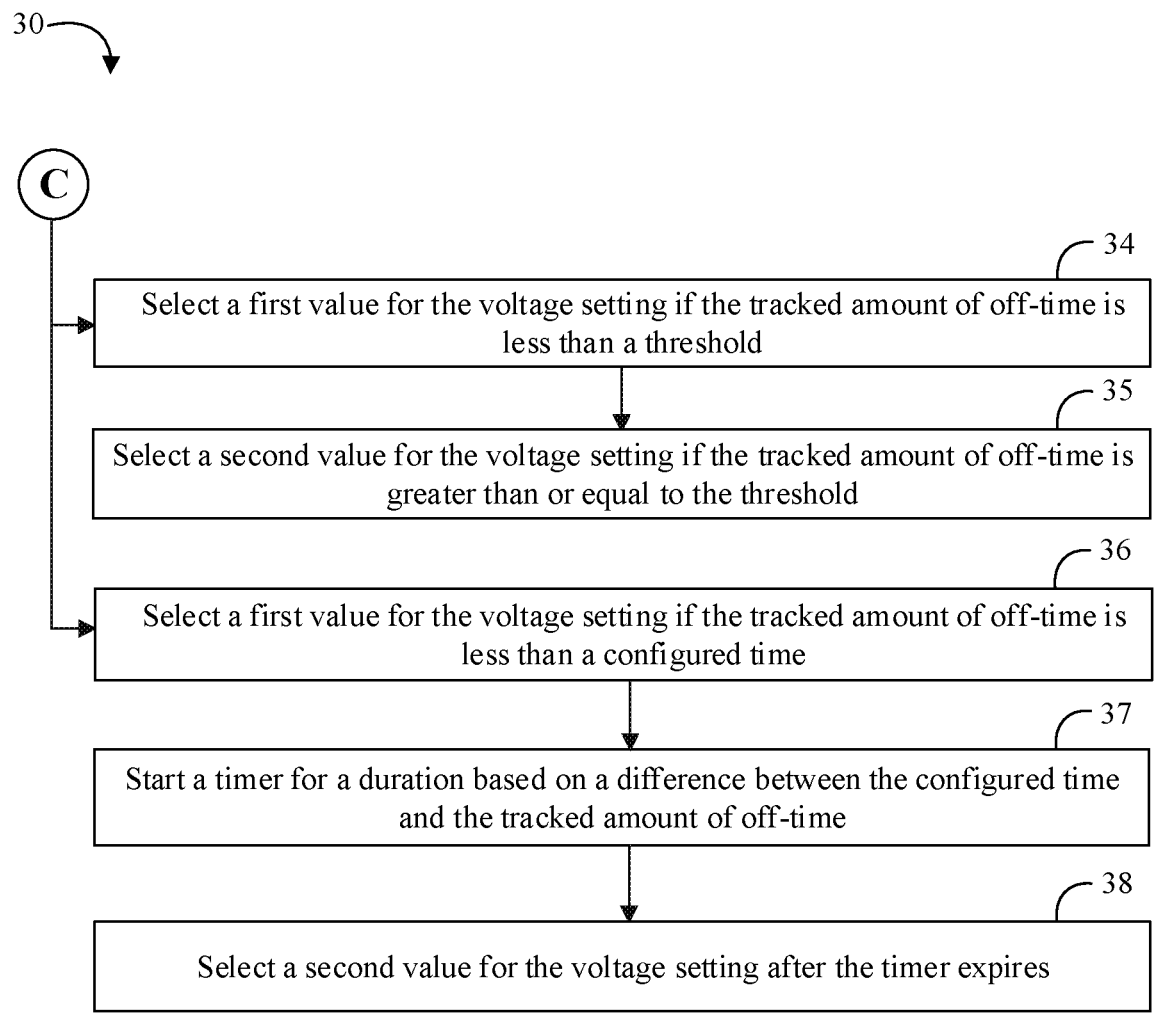

Turning now to FIGS. 3A to 3C, an embodiment of a method 30 of controlling storage may include detecting a power interruption event at block 31, and tracking an amount of off-time for a persistent storage media after the detected power interruption event at block 32. Some embodiments of the method 30 may further include determining a voltage setting to use for an operation on the persistent storage media after power restoration based on the tracked amount of off-time at block 33. For example, the method 30 may include selecting a first value for the voltage setting if the tracked amount of off-time is less than a threshold at block 34, and selecting a second value for the voltage setting if the tracked amount of off-time is greater than or equal to the threshold at block 35. Alternatively, or additionally, the method 30 may include selecting a first value for the voltage setting if the tracked amount of off-time is less than a configured time at block 36, starting a timer for a duration based on a difference between the configured time and the tracked amount of off-time at block 37, and selecting a second value for the voltage setting after the timer expires at block 38. Some embodiments of the method 30 may further include providing backup power for tracking the amount of off-time for the persistent storage media after the power interruption event at block 39. In any of the embodiments herein, the persistent storage media may comprise PCM at block 40.

Embodiments of the method 30 may be implemented in a system, apparatus, computer, device, etc., for example, such as those described herein. More particularly, hardware implementations of the method 30 may include analog circuitry, configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#or the like and conventional procedural programming languages, such as the "C" programming language or similar programming languages.

For example, the method 30 may be implemented on a computer readable medium as described in connection with Examples 21 to 26 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously utilize off-time tracker information to improve SSD/NVDIMM restart performance. Without being limited to particular implementations, the characteristics of some media may benefit from a different voltage setting depending on how much time has passed since a previous operation. The timing may ensure that the distribution between a memory cell representation of a logical zero (0) and a logical one (1) has settled enough for a successful operation.

Some storage systems may utilize a memory to track the timestamps of recent writes to improve read performance. If the memory indicates that sufficient time has elapsed since the cell was written, the memory read command can go directly to better performance voltage (V2) settings for improved performance. A problem is that during power loss, the memory containing the list of recent writes is also lost. Without the list, there is no information on when cells were written last and as a result, in some other systems the controller may use safer voltage (V1) settings or may add some nominal wait time after the subsequent power up, increasing the memory command latency. Increased memory command latency also reduces system responsiveness. Advantageously, some embodiments may provide technology to significantly improve memory command latency related to the voltage setting uncertainty at startup time (e.g., particularly for storage class memory (SCM) for client workloads, or other memory types that exhibit time-dependent behaviors).

Some embodiments may include a low power circuit to measure how long the drive has been turned off (e.g., a time tracking device such as a decaying capacitor voltage, a real-time clock, a count-down timer circuit, a count-up timer circuit, etc.). The measured time information may advantageously be utilized to determine a SCM's appropriate voltage setting (e.g., V1 or V2) for use in the subsequent power up, significantly improving the read performance if the drive has been turned off for more than the minimum configured time. Some implementations of the circuit may be very low cost because only a short period of time must be tracked. If sufficient off time has elapsed, the safe V1 settings do not need to be used on any addresses and the SCM can go directly to V2 for higher performance. Advantageously, startup performance is enhanced for any scenarios when off time is greater than the configured time (e.g., which may be a common scenario in data center applications), which may correspond to measurably higher performance and responsiveness in an electronic storage product.

In an example implementation, a power management integrated circuit (PMIC) provides technology for tracking off time between power cycles to determine if power has been re-applied in less than a time threshold after the power-off event. The off-time tracker may include a timer which is set to the time threshold and then counts down after the power-off event. The PMIC will not continue to elapse the timer after power-on. Upon power-on, the firmware (FW) or the controller will read the status from the PMIC to determine how much time has elapsed. If the timer has expired, the PMIC will report that status. If less time than the time threshold has elapsed, the FW/controller may start a new timer for the remaining duration or may have the timer continue lapsing until it expires.

Alternatively, the PMIC may utilize an off-time tracker which includes a count up timer which is initialized to zero after the power-off event. Upon power-on, the count up timer may be compared against the time threshold. If the count up timer is greater than the threshold, the media can go directly to the voltage setting for higher performance. Otherwise, the FW/controller may start a new timer for the remaining duration by subtracting the elapsed time of the count up timer from the time threshold. Those skilled in the art will appreciate that the foregoing are just implementation example, and numerous other implementations will occur to those skilled in the art given the benefit of the present application.

Figure 4:
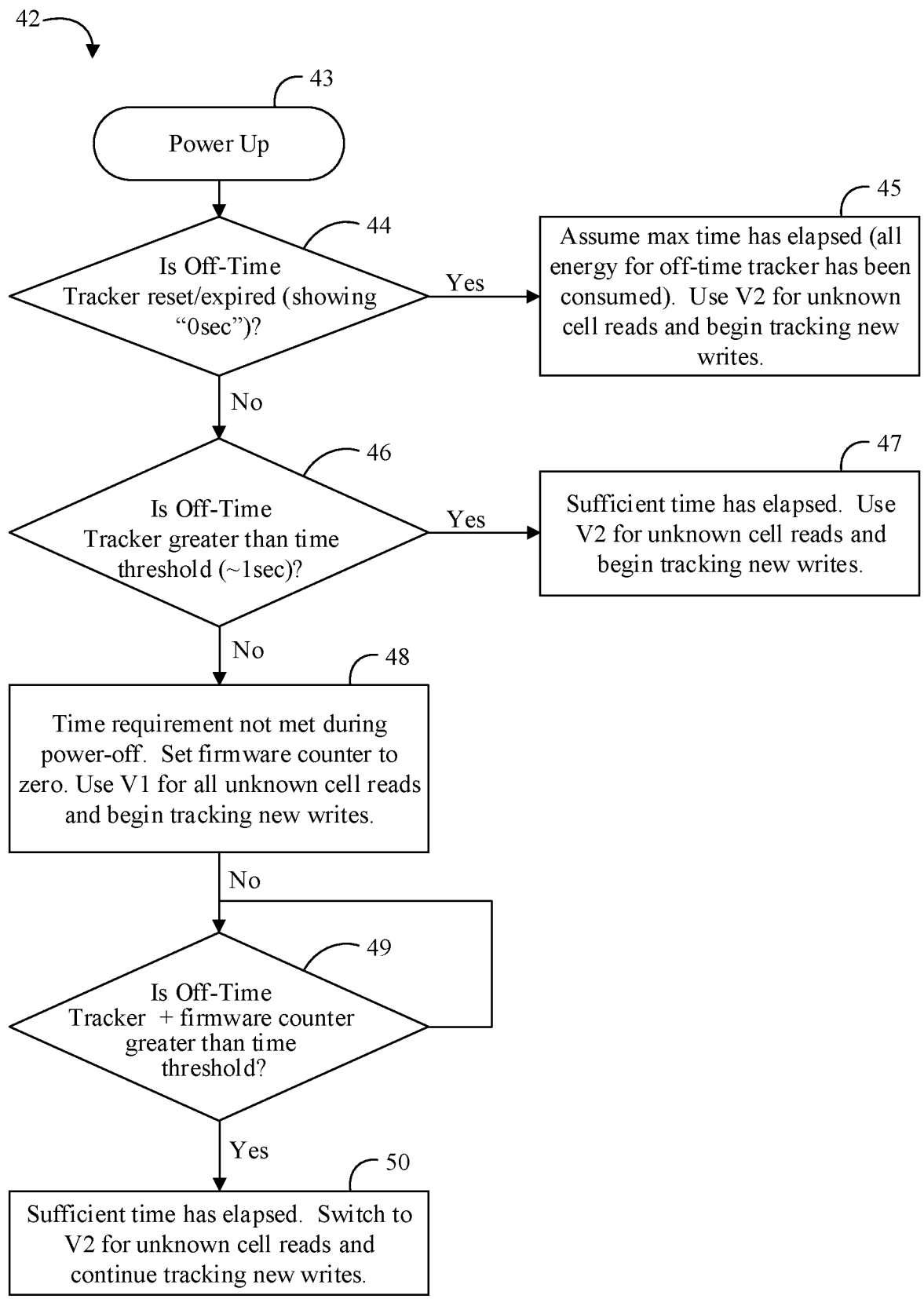
FIG. 4 is a flowchart of an example of a method of restarting a SSD based on tracked off-time according to an embodiment.

Turning now to FIG. 4, an embodiment of a method 42 of restarting a SSD shows an example for handling of the voltage settings based on the feedback from an off-time tracker. The method 42 may include powering up at block 43, and determining if the off-time tracker is reset and/or expired at block 44. If so, the method 42 may include using V2 for unknown cell operations and beginning to track new operations at block 45 (e.g., assuming that a maximum time has elapsed because all energy for the off-time tracker has been consumed). If not, the method 42 may next include determining if the off-time tracker is greater than a time threshold at block 46 (e.g., about one second for some media). If so, the method 42 may include using V2 for unknown cell operations and beginning to track new operations at block 47 (e.g., because sufficient time has elapsed). If not, the method 42 may include setting a firmware counter to zero, and using V1 for all unknown cell operations and beginning to track new operations at block 48 (e.g., because the time requirement was not met during power-off). The method 42 may then include determining if the off-time tracker plus the firmware counter is greater than the time threshold at block 49 and, if not, incrementing the firmware counter and looping back to block 49 until sufficient time has elapsed. After the off-time tracker plus the firmware counter is greater than the time threshold at block 49, the method 42 may proceed to switching to V2 for unknown cell operations and continuing to track new operations at block 50.

Alternatively, if the time requirement was not met during power off, the method 42 may include setting the firmware counter to the remaining duration (e.g., based on the difference between the off-time tracker and the time threshold), and counting the firmware counter down to zero. In another alternative, the method 42 may include elapsing the off-time tracker to zero (e.g., for a count down tracker) or elapsing the off-time tracker until the off-time tracker exceeds the time threshold (e.g., for a count up tracker).

There are numerous ways in which to implement the off-time tracker including, for example, using a decaying capacitor, a timer, or a real time clock. In some embodiments, energy for the off-time tracker may be supplied from a residual stored energy (e.g., a capacitor) that may already be present in the system to ensure required power loss housekeeping activities are successfully completed. The residual stored energy may run the off-time tracker long enough for some embodiments to advantageously use the off-time information to determine the time since the last write operation and determine the voltage level to use based on the time information.

The technology discussed herein may be utilized in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 5:
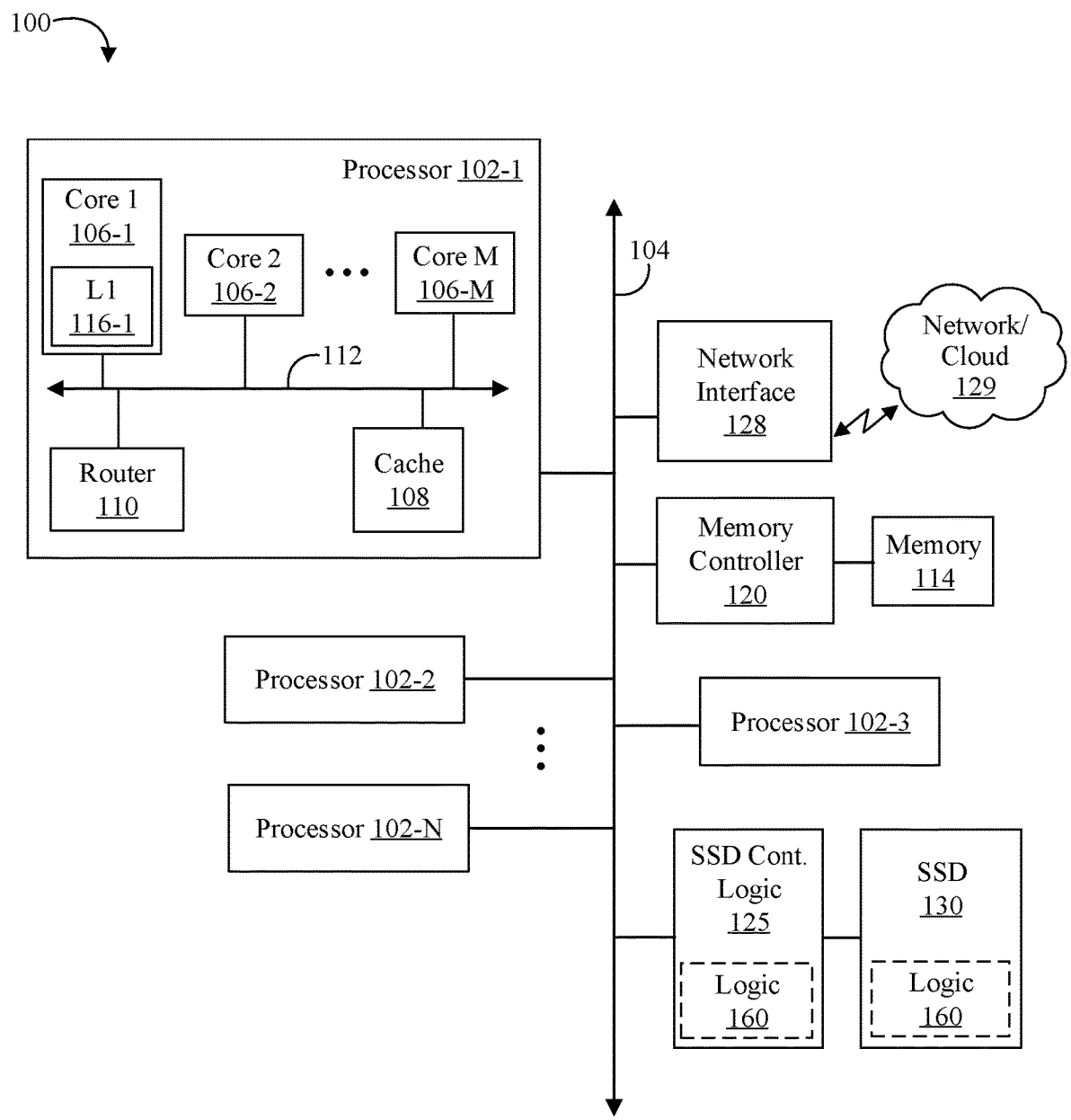
FIG. 5 is a block diagram of an example of a computing system according to an embodiment.

Turning now to FIG. 5, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 5, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 5, memory 114 may be coupled to other components of system 100 through a memory controller 120. Memory 114 may include volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include Non-Volatile (NV) storage device such as a SSD 130 coupled to the interconnect 104 via SSD controller logic 125. Hence, logic 125 may control access by various components of system 100 to the SSD 130. Furthermore, even though logic 125 is shown to be directly coupled to the interconnection 104 in FIG. 5, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc. Additionally, logic 125 may be incorporated into memory controller logic (such as those discussed with reference to FIG. 6) or provided on a same integrated circuit (IC) device in various embodiments (e.g., on the same IC device as the SSD 130 or in the same enclosure as the SSD 130).

Furthermore, logic 125 and/or SSD 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, SSD 130, SSD bus, SATA bus, logic 125, logic 160, etc., to sense variations in various factors affecting power/thermal behavior of the system/platform, such as temperature, operating frequency, operating voltage, power consumption, and/or inter-core communication activity, etc.

Figure 6:
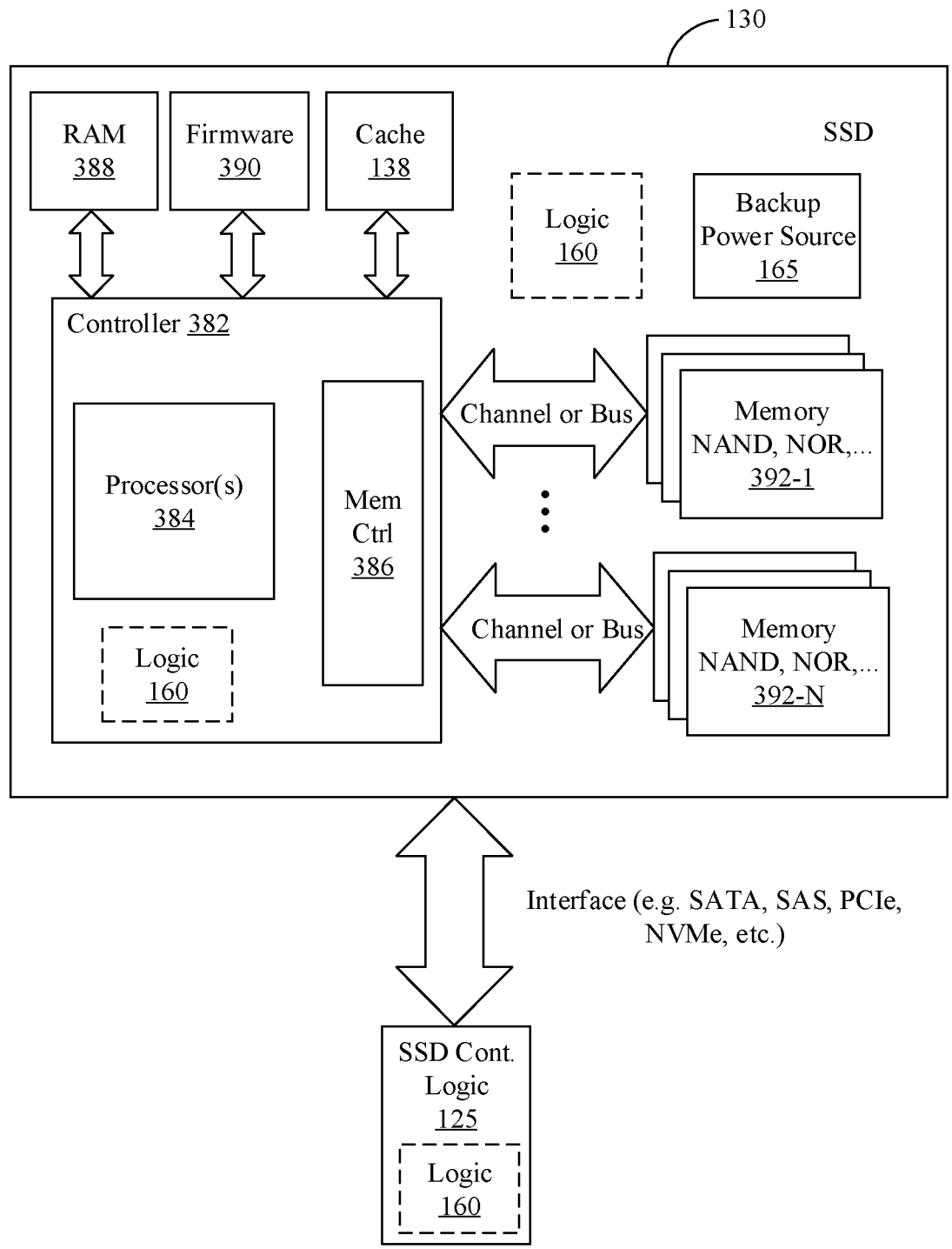
FIG. 6 is a block diagram of an example of a SSD according to an embodiment.

FIG. 6 illustrates a block diagram of various components of the SSD 130, according to an embodiment. As illustrated in FIG. 6, logic 160 may be located in various locations such as inside the SSD 130 or controller 382, etc., and may include similar technology as discussed in connection with FIG. 5. SSD 130 includes a controller 382 (which in turn includes one or more processor cores or processors 384 and memory controller logic 386), cache 138, RAM 388 (e.g., DRAM, SRAM, NV RAM, PCM, battery backed-up or imminent power loss (IPL) backed-up DRAM or SRAM, etc.), firmware storage 390, and one or more memory modules or dies 392-1 to 392-N (collectively memory 392, which may include NAND flash, NOR flash, PCM, INTEL 3D)(POINT, or other types of non-volatile memory). Memory modules 392-1 to 392-N are coupled to the memory controller logic 386 via one or more memory channels or busses. Also, SSD 130 communicates with logic 125 via an interface (such as a SATA, SAS, PCIe, NVMe, etc., interface). The SSD 130 further includes a backup power source 165 which is coupled at least to the logic 160. One or more of the features/aspects/operations discussed with reference to FIGS. 1-4 may be performed by one or more of the components of FIG. 6. Processors 384 and/or controller 382 may compress/decompress (or otherwise cause compression/decompression of) data written to or read from memory modules 392-1 to 392-N. Also, one or more of the features/aspects/operations of FIGS. 1-4 may be programmed into the firmware 390. Further, SSD controller logic 125 may also include logic 160.

As illustrated in FIGS. 5 and 6, SSD 130 may include logic 160, which may be in the same enclosure as the SSD 130 and/or fully integrated on a printed circuit board (PCB) of the SSD 130. Advantageously, the logic 160 may include technology to implement one or more aspects of the method 30 (FIGS. 3A to 3C), and/or the method 42 (FIG. 4). For example, the logic 160 may include technology to detect a power interruption event (e.g., shut down, sleep, hibernate, brown out, etc.), and track an amount of off-time for the memory 392 after the detected power interruption event. In some embodiments, the logic 160 may be further configured to determine a voltage for operations on the memory 392 after power restoration based on the tracked amount of off-time. For example, the logic 160 may be configured to select a first value for the voltage if the tracked amount of off-time is less than a threshold, and select a second value for the voltage if the tracked amount of off-time is greater than or equal to the threshold. Alternatively, or additionally, the logic 160 may be configured to select a first value for the voltage if the tracked amount of off-time is less than a configured time, start a timer for a duration based on a difference between the configured time and the tracked amount of off-time, and select a second value for the voltage after the timer expires.

The backup power source 165 provides power to the logic 160 to track the amount of off-time for the memory 392 after the power interruption event. For example, the backup power source 165 may include a battery, an energy storing capacitor, etc. The logic 160 may also include an energy storing capacitor which may be utilized as a timer circuit to track the amount of off-time based on a decay of the capacitor after the power interruption event. In any of the embodiments herein, the memory 392 may comprise any type of media (e.g., including PCM technology such as INTEL 3D)(POINT). In some embodiments, all or portions of the logic 160 may be implemented as a PMIC.

In other embodiments, the SSD 130 may be replaced with any suitable persistent storage technology/media (e.g., NVDIMM). In some embodiments, the logic 160 may be coupled to one or more substrates (e.g., silicon, sapphire, gallium arsenide, printed circuit board (PCB), etc.), and may include transistor channel regions that are positioned within the one or more substrates. In other embodiments, the SSD 130 may include two or more types of persistent storage media and may be considered a hybrid SSD. For example, the bulk of the storage may be NAND and the SSD 130 may further include some faster, smaller granularity accessible (e.g., byte-addressable) NVM such as INTEL 3DXP media (e.g., which may be utilized to implement the transfer buffer). The SSD 130 may alternatively, or additionally, include persistent volatile memory (e.g., battery or capacitor backed-up DRAM or SRAM). For example, some SSDs may include POWER LOSS IMMINENT (PLI) technology with energy storing capacitors for the backup power source 165. The energy storing capacitors may provide enough energy (power) to complete any commands in progress and to make sure that any data in the DRAMs/SRAMs is committed to the non-volatile NAND media. The capacitors may act as backup batteries for the SSD 130 and/or the logic 160. As shown in FIG. 5, features or aspects of the logic 160 may be distributed throughout the SSD 130, and/or co-located/integrated with various components of the SSD 130.

ADDITIONAL NOTES AND EXAMPLES

Example 1 includes a semiconductor apparatus for use with a persistent storage media, comprising one or more substrates, and logic coupled to the one or more substrates, wherein the logic is at least partly implemented in one or more of configurable logic and fixed-functionality hardware logic, the logic coupled to the one or more substrates to detect a power interruption event, and track an amount of off-time for a persistent storage media after the detected power interruption event.

Example 2 includes the apparatus of Example 1, wherein the logic is further to determine a voltage setting to use for an operation on the persistent storage media after power restoration based on the tracked amount of off-time.

Example 3 includes the apparatus of Example 2, wherein the logic is further to select a first value for the voltage setting if the tracked amount of off-time is less than a threshold, and select a second value for the voltage setting if the tracked amount of off-time is greater than or equal to the threshold.

Example 4 includes the apparatus of Example 2, wherein the logic is further to select a first value for the voltage setting if the tracked amount of off-time is less than a configured time, start a timer for a duration based on a difference between the configured time and the tracked amount of off-time, and select a second value for the voltage setting after the timer expires.

Example 5 includes the apparatus of any of Examples 1 to 4, wherein the logic is further to provide backup power to track the amount of off-time for the persistent storage media after the power interruption event.

Example 6 includes the apparatus of any of Examples 1 to 5, wherein the persistent storage media comprises PCM.

Example 7 includes the apparatus of any of Examples 1 to 6, wherein the logic coupled to the one or more substrates includes transistor channel regions that are positioned within the one or more substrates.

Example 8 includes an electronic storage system, comprising a controller, persistent storage media communicatively coupled to the controller, and logic communicatively coupled to the controller to detect a power interruption event, and track an amount of off-time for the persistent storage media after the detected power interruption event.

Example 9 includes the system of Example 8, wherein the logic is further to determine a voltage setting to use for an operation on the persistent storage media after power restoration based on the tracked amount of off-time.

Example 10 includes the system of Example 9, wherein the logic is further to select a first value for the voltage setting if the tracked amount of off-time is less than a threshold, and select a second value for the voltage setting if the tracked amount of off-time is greater than or equal to the threshold.

Example 11 includes the system of Example 9, wherein the logic is further to select a first value for the voltage setting if the tracked amount of off-time is less than a configured time, start a timer for a duration based on a difference between the configured time and the tracked amount of off-time, and select a second value for the voltage setting after the timer expires.

Example 12 includes the system of any of Examples 8 to 11, further comprising a backup power source to provide power to the logic to track the amount of off-time for the persistent storage media after the power interruption event.

Example 13 includes the system of Example 12, wherein one or more of the logic to track the amount of off-time and the backup power source comprises an energy storing capacitor.

Example 14 includes the system of any of Examples 8 to 13, wherein the persistent storage media comprises PCM.

Example 15 includes a method of controlling storage, comprising detecting a power interruption event, and tracking an amount of off-time for a persistent storage media after the detected power interruption event.

Example 16 includes the method of Example 15, further comprising determining a voltage setting to use for an operation on the persistent storage media after power restoration based on the tracked amount of off-time.

Example 17 includes the method of Example 16, further comprising selecting a first value for the voltage setting if the tracked amount of off-time is less than a threshold, and selecting a second value for the voltage setting if the tracked amount of off-time is greater than or equal to the threshold.

Example 18 includes the method of Example 16, further comprising selecting a first value for the voltage setting if the tracked amount of off-time is less than a configured time, starting a timer for a duration based on a difference between the configured time and the tracked amount of off-time, and selecting a second value for the voltage setting after the timer expires.

Example 19 includes the method of any of Examples 15 to 18, further comprising providing backup power for tracking the amount of off-time for the persistent storage media after the power interruption event.

Example 20 includes the method of any of Examples 15 to 19, wherein the persistent storage media comprises NAND media.

Example 21 includes at least one computer readable storage medium, comprising a set of instructions, which when executed by a computing device, cause the computing device to detect a power interruption event, and track an amount of off-time for a persistent storage media after the detected power interruption event.

Example 22 includes at least one computer readable storage medium of Example 21, comprising a further set of instructions, which when executed by the computing device, cause the computing device to determine a voltage setting to use for an operation on the persistent storage media after power restoration based on the tracked amount of off-time.

Example 23 includes at least one computer readable storage medium of Example 22, comprising a further set of instructions, which when executed by the computing device, cause the computing device to select a first value for the voltage setting if the tracked amount of off-time is less than a threshold, and select a second value for the voltage setting if the tracked amount of off-time is greater than or equal to the threshold.

Example 24 includes at least one computer readable storage medium of Example 22, comprising a further set of instructions, which when executed by the computing device, cause the computing device to select a first value for the voltage setting if the tracked amount of off-time is less than a configured time, start a timer for a duration based on a difference between the configured time and the tracked amount of off-time, and select a second value for the voltage setting after the timer expires.

Example 25 includes at least one computer readable storage medium of any of Examples 21 to 24, comprising a further set of instructions, which when executed by the computing device, cause the computing device to provide backup power to track the amount of off-time for the persistent storage media after the power interruption event.

Example 26 includes at least one computer readable storage medium of any of Examples 21 to 25, wherein the persistent storage media comprises PCM.

Example 27 includes a storage controller apparatus, comprising means for detecting a power interruption event, and means for tracking an amount of off-time for a persistent storage media after the detected power interruption event.

Example 28 includes the apparatus of Example 27, further comprising means for determining a voltage setting to use for an operation on the persistent storage media after power restoration based on the tracked amount of off-time.

Example 29 includes the apparatus of Example 28, further comprising means for selecting a first value for the voltage setting if the tracked amount of off-time is less than a threshold, and means for selecting a second value for the voltage setting if the tracked amount of off-time is greater than or equal to the threshold.

Example 30 includes the apparatus of Example 28, further comprising means for selecting a first value for the voltage setting if the tracked amount of off-time is less than a configured time, means for starting a timer for a duration based on a difference between the configured time and the tracked amount of off-time, and means for selecting a second value for the voltage setting after the timer expires.

Example 31 includes the apparatus of any of Examples 27 to 30, further comprising means for providing backup power for tracking the amount of off-time for the persistent storage media after the power interruption event.

Example 32 includes the apparatus of any of Examples 27 to 31, wherein the persistent storage media comprises PCM.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. Persistent storage media, comprising:
   one or more substrates; and
   logic coupled to the one or more substrates, wherein the logic is at least partly implemented in one or more of configurable logic and fixed-functionality hardware logic, the logic coupled to the one or more substrates to:
   detect a power interruption event,
   track an amount of off-time for the persistent storage media after the detected power interruption event,
   determine a voltage setting to use for an operation on the persistent storage media after power restoration based on the tracked amount of off-time, and
   instruct application of the voltage setting after the power restoration.

2. The persistent storage media of claim 1, wherein the logic is further to:
   select a first value for the voltage setting if the tracked amount of off-time is less than a threshold; and
   select a second value for the voltage setting if the tracked amount of off-time is greater than or equal to the threshold.

3. The persistent storage media of claim 1, wherein the logic is further to:
   select a first value for the voltage setting if the tracked amount of off-time is less than a configured time;
   start a timer for a duration based on a difference between the configured time and the tracked amount of off-time; and
   select a second value for the voltage setting after the timer expires.

4. The persistent storage media of claim 1, wherein the logic is further to:
   provide backup power to the logic to track the amount of off-time for the persistent storage media after the power interruption event.

5. The persistent storage media of claim 1, wherein the persistent storage media comprises phase change memory.

6. The persistent storage media of claim 1, wherein the logic coupled to the one or more substrates includes transistor channel regions that are positioned within the one or more substrates.

7. An electronic storage system, comprising:
   a controller;
   persistent storage media communicatively coupled to the controller; and
   logic communicatively coupled to the controller to:
   detect a power interruption event,
   track an amount of off-time for the persistent storage media after the detected power interruption event,
   determine a voltage setting to use for an operation on the persistent storage media after power restoration based on the tracked amount of off-time, and
   instruct application of the voltage setting after the power restoration.

8. The electronic storage system of claim 7, wherein the logic is further to:
   select a first value for the voltage setting if the tracked amount of off-time is less than a threshold; and
   select a second value for the voltage setting if the tracked amount of off-time is greater than or equal to the threshold.

9. The electronic storage system of claim 7, wherein the logic is further to:
   select a first value for the voltage setting if the tracked amount of off-time is less than a configured time;
   start a timer for a duration based on a difference between the configured time and the tracked amount of off-time; and
   select a second value for the voltage setting after the timer expires.

10. The electronic storage system of claim 7, further comprising:
    a backup power source to provide power to the logic to track the amount of off-time for the persistent storage media after the power interruption event.

11. The electronic storage system of claim 10, wherein one or more of the logic to track the amount of off-time and the backup power source comprises an energy storing capacitor.

12. The electronic storage system of claim 7, wherein the persistent storage media comprises phase change memory.

13. A method of controlling persistent storage media, comprising:
    detecting a power interruption event;

tracking an amount of off-time for the persistent storage media after the detected power interruption event;

determining a voltage setting to use for an operation on the persistent storage media after power restoration based on the tracked amount of off-time; and instructing application of the voltage setting after the power restoration.

14. The method of claim 13, further comprising:

selecting a first value for the voltage setting if the tracked amount of off-time is less than a threshold; and selecting a second value for the voltage setting if the tracked amount of off-time is greater than or equal to the threshold.

15. The method of claim 13, further comprising:

selecting a first value for the voltage setting if the tracked amount of off-time is less than a configured time;

starting a timer for a duration based on a difference between the configured time and the tracked amount of off-time; and selecting a second value for the voltage setting after the timer expires.

16. The method of claim 13, further comprising:

providing backup power for tracking the amount of off-time for the persistent storage media after the power interruption event.

17. The method of claim 13, wherein the persistent storage media comprises phase change memory media.

* * * * *